United States Patent
Feng et al.

(10) Patent No.: US 9,658,894 B2
(45) Date of Patent: May 23, 2017

(54) AUTOMATICALLY AND DYNAMICALLY RECLAIMING RESOURCES DURING VIRTUAL MACHINE DECOMMISSION

(71) Applicant: International Business Machines Corporation, Armonk, NY (US)

(72) Inventors: Yong Feng, Unionville (CA); Heng Ping Xu, Shanghai (CN); Ying Nan Zhang, Shanghai (CN); Yu Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/883,673

(22) Filed: Oct. 15, 2015

(65) Prior Publication Data

US 2017/0109211 A1    Apr. 20, 2017

(51) Int. Cl.
*G06F 9/50* (2006.01)
*G06F 9/455* (2006.01)

(52) U.S. Cl.
CPC ........ *G06F 9/5055* (2013.01); *G06F 9/45558* (2013.01); *G06F 2009/4557* (2013.01); *G06F 2209/504* (2013.01); *G06F 2209/5017* (2013.01)

(58) Field of Classification Search
CPC ............... G06F 9/5055; G06F 9/45558; G06F 2009/4557; G06F 2209/5017; G06F 2209/504
See application file for complete search history.

(56) References Cited

U.S. PATENT DOCUMENTS

| | | | |
|---|---|---|---|
| 8,161,479 B2 | 4/2012 | Sedukhin et al. | |
| 8,738,972 B1* | 5/2014 | Bakman | G06F 11/0712 714/47.1 |
| 8,789,041 B2 | 7/2014 | Verma | |
| 8,997,051 B2 | 3/2015 | Robertson et al. | |
| 2013/0218549 A1* | 8/2013 | Sultan | G06F 9/45533 703/19 |
| 2014/0007097 A1 | 1/2014 | Chin et al. | |
| 2014/0032761 A1 | 1/2014 | Beveridge | |
| 2014/0082612 A1 | 3/2014 | Breitgand et al. | |
| 2014/0137112 A1 | 5/2014 | Rigolet | |
| 2015/0356279 A1* | 12/2015 | Montana | G06F 21/105 726/28 |
| 2016/0019074 A1* | 1/2016 | Nahir | H04L 67/10 718/1 |

* cited by examiner

*Primary Examiner* — Timothy A Mudrick
*Assistant Examiner* — Abdou Seye
(74) *Attorney, Agent, or Firm* — Khyle J. Eaton (57) ABSTRACT

Embodiments of the present invention provide a method, computer program product, and computer system for reclaiming resources during virtual machine decommission. The method includes determining a virtual machine (VM) resource utilization and a cluster utilization. If the VM resource utilization is less than a first predetermined threshold and the cluster utilization is greater than a second predetermined threshold, the method then determines whether an active timer exists. If the active timer exists and has expired, then dynamic decommission of the VM is triggered.

20 Claims, 4 Drawing Sheets

AUTOMATICALLY AND DYNAMICALLY RECLAIMING RESOURCES DURING VIRTUAL MACHINE DECOMMISSION

BACKGROUND OF THE INVENTION

The present invention relates generally to the field of virtual machines, and more particularly to optimizing the process of virtual machine decommission to reclaim resources.

In computing, a virtual machine (VM) is an emulation of a particular computer system. Virtual machines operate based on the computer architecture and functions of a real or hypothetical computer, and their implementations may involve specialized hardware, software, or a combination of both. Virtual machines can be Linux Containers, Dockers, or ZeroVM, etc.

Classification of virtual machines can be based on the degree to which they implement functionality of targeted real machines. That way, system virtual machines (also known as full virtualization VMs) provide a complete substitute for the targeted real machine and a level of functionality required for the execution of a complete operating system. On the other hand, process virtual machines are designed to execute a single computer program by providing an abstracted and platform-independent program execution environment.

Some computer architectures are capable of hardware-assisted virtualization, which enables efficient full virtualization by using virtualization-specific hardware capabilities, primarily from the host CPUs.

A zombie VM is a VM that is not functioning properly in a software environment, but continues to operate, sucking up resources and providing no value. The term zombie VM is sometimes used interchangeably with the term orphaned VM, which is a machine that has been disconnected from its host. However, with a zombie VM, there is the implication that the VM is still actively using resources since it is still connected to its host. Along with incorrectly configured VMs, system administrators also look for disconnected or otherwise useless VMDK files, the files held on these systems, to try to clean up and prevent what is often called VM sprawl. VM sprawl happens when more VMs are deployed or created than are necessary. This occurs largely because of inefficiencies in building out systems and because of changes in systems over time, where, without rigorous analysis and constant management, resources become tied up in obsolete configurations.

SUMMARY

A method, computer program product, and computer system for reclaiming resources during virtual machine decommission, the method comprising: receiving, by one or more computer processors, information regarding resource utilization of a virtual machine (VM); determining, by one or more computer processors, whether the resource utilization of the VM is less than a first predetermined threshold; determining, by one or more computer processors, whether a cluster utilization of the VM is greater than a second predetermined threshold; determining, by one or more computer processors, whether a timer is active; in response to determining that the timer is active, determining, by one or more computer processors, whether the timer has expired; and in response to determining that the timer has expired, triggering, by one or more computer processors, a dynamic decommission of the VM.

DETAILED DESCRIPTION

The process of virtual machine (VM) decommission may last for a long period of time. During this process, the requirement of the resources for the VM may be different from the running status. During the VM servicing period, the resource consumption will fluctuate due to different apps, different jobs, and different phases. However, the resources needed in the decommission process will tend to decrease. Therefore, some of the resources of the VM can be released to make the utilization of the information technology (IT) infrastructure more efficient. Embodiments of the present invention provide systems, methods, and computer program products to reclaim resources during virtual machine decommission.

Figure 1:
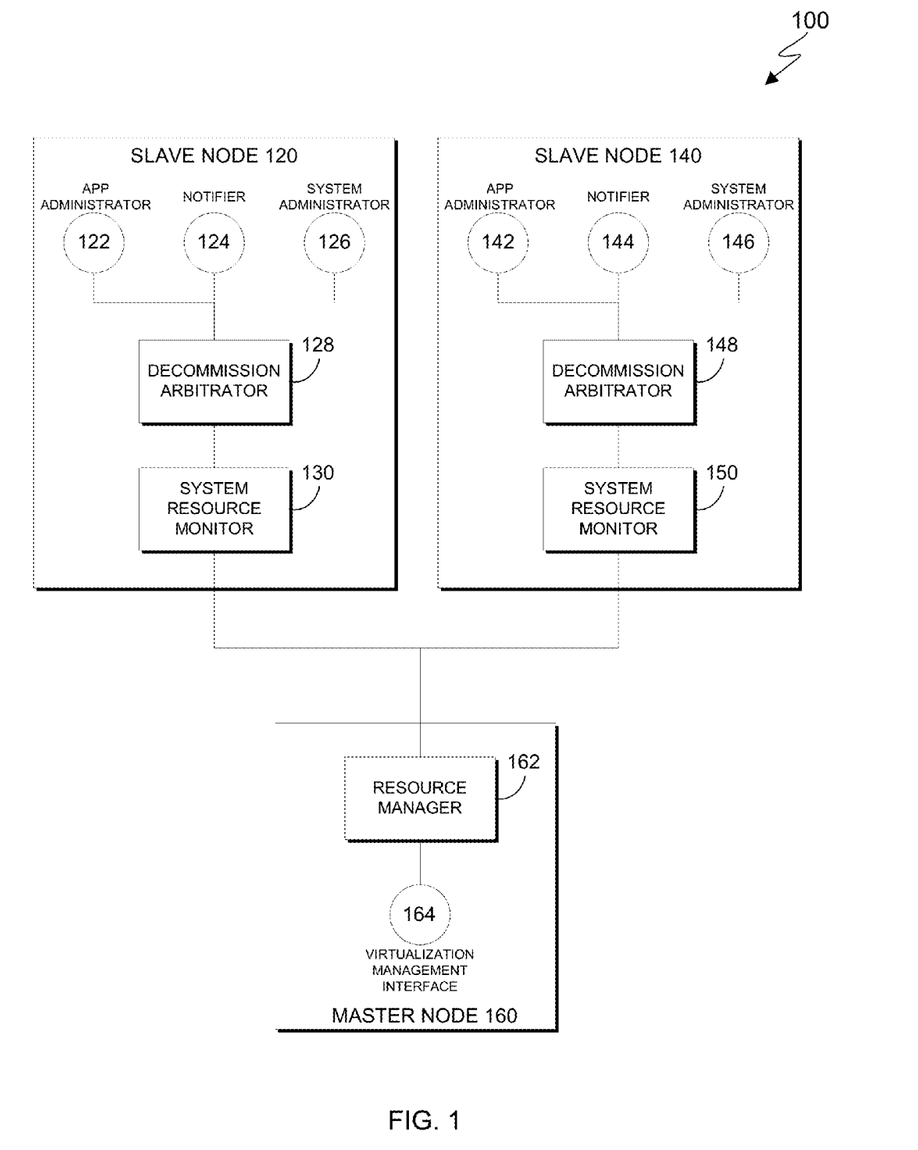
FIG. 1 is a functional block diagram illustrating a computing environment, in accordance with an embodiment of the present invention.

The present invention will now be described in detail with reference to the figures. FIG. 1 is a functional block diagram illustrating a computing environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, computing environment 100 includes slave node 120, slave node 140, and master node 160.

Slave node 120 includes app administrator 122, notifier 124, system administrator 126, decommission arbitrator 128, and system resource monitor 130. Slave node 140 includes app administrator 142, notifier 124, system administrator 146, decommission arbitrator 148, and system resource monitor 150. The components of slave node 120 and slave node 140 are functionally similar. For the purposes of this description, the components of slave node 120 will be described, it being understood that the description of the components of slave node 120 may also be used as the description of the corresponding components of slave node 140. Master node 160 includes resource manager 162 and virtualization management interface 164.

System administrator 126 determines when to retrieve the VM. App administrator 122 determines when the app starts the finishing jobs and when it stops the finishing jobs. Notifier 124 notifies app administrator 122 that is should not assign new jobs to the VM after system administrator 126 decided to retrieve it, and notifies master node 160 that the VM can be destroyed.

Decommission arbitrator 128 provides interfaces which are called by app administrator 122 and system administrator 126. These calls include retrieve( ), decommission_start( ), and decommission_stop( ). Retrieve( ) is called by system administrator 126 to notify the system that the virtual machine (VM) should be retrieved. Decommission_start( ) is called by app administrator 122 to notify the system that the running app has finished its main job and started the finishing jobs. Decommission_stop( ) is called by app administrator 122 to let the system know the app has finished all of its jobs. Decommission arbitrator 128 will make a decision based on these calls. For example, if retrieve( ) hasn't been called, then calling both decommission_start( ) and decommission_stop( ) will do nothing. If retrieve( ) has been called then calling decommission_start( ) will notify system resource monitor 130 to start the decommission phase, and calling decommission_stop( ) will notify system resource monitor 130 that the decommission phase is completed. Slave node 120 also includes notifier 124 to notify app administrator 122 that no new task should come to the current VM. This ensures that app administrator 122 should no longer assign new jobs to the current VM. System resource monitor 130 monitors system resource (i.e., CPU, memory, and disk) utilization and submits information to resource manager 162 during the decommission stage.

Resource manager 162 is responsible for determining: (i) how many resources should be released; and (ii) if the current VM is a zombie. Resource manager 162 determines how many resources should be released based on: (i) resource utilization and the maximum resources the VM holds, which is reported by the VM during the decommission stage; and (ii) resource utilization of the entire cluster, which can be retrieved from virtualization management interface 164. When resource manager 162 decides that there are resources that can be released, it notifies virtualization management interface 164 to release the resource for the VM. There are two triggers for resource manager 162 to notify system administrator 126 to release the VM: (i) receiving the decommission stop from app administrator 122; or (ii) determining that the VM has become a zombie.

Slave node 120 receives inputs from app administrator 122 and system administrator 126. These inputs are transferred to decommission arbitrator 128 to decide whether the VM has entered an extended decommission stage. This decision triggers system resource monitor 130 to detect the resource usage, during the decommission stage of the VM and report its resource utilization to resource manager 162 located on master node 160 (which normally is the VM management node). Master node 160 gathers the resource utilization information to determine whether the VM should release resources and, if so, how many resources the VM should release. This determination will be sent to virtualization management interface 164 to adjust the VM resources.

Figure 2:
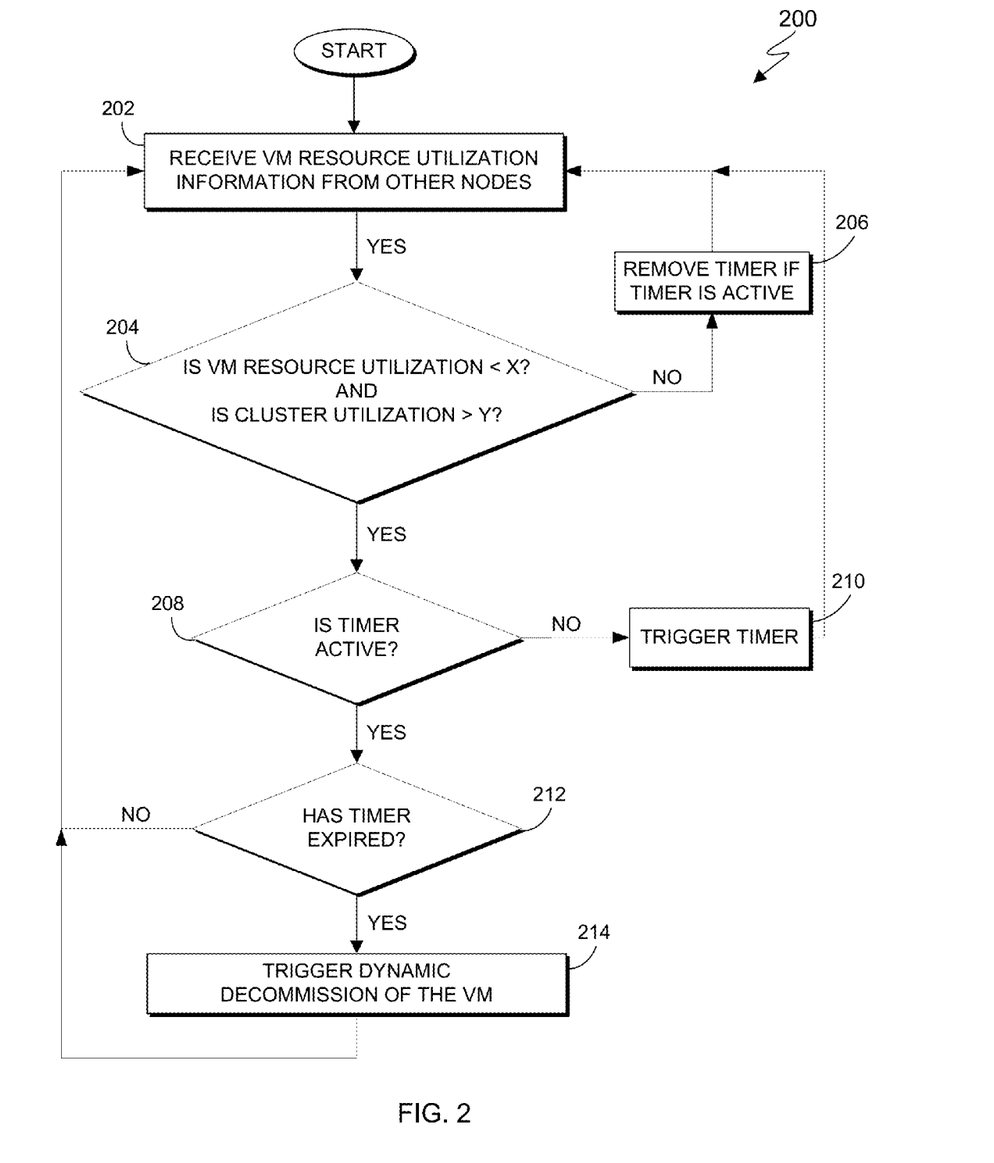
FIG. 2 is a flowchart depicting operational steps for reclaiming resources during virtual machine decommission, in accordance with an embodiment of the present invention.

FIG. 2 is a flowchart, 200, depicting the operational steps of resource manager 162 for reclaiming resources during virtual machine decommission, in accordance with an embodiment of the present invention.

In step 202, resource manager 162 receives VM resource utilization information from other nodes. In this exemplary embodiment, resource manager 162 receives VM resource utilization information from system resource monitors 130 and 150 located on slave nodes 120 and 140, respectively. During the decommission phase, resource manager 162 will also try to identify the zombie VMs by monitoring the resource usage. If resource manager 162 finds the network usage is zero and the zero usage lasts for a predetermined period of time, resource manager 162 will mark the current VM as a zombie and also call the application programming interface (API) adaptor to destroy it.

In step 204, resource manager 162 determines if VM resource utilization is below a predetermined threshold and if cluster utilization is above a predetermined threshold.

If, in step 204, resource manager 162 determines that VM resource utilization is not below the predetermined threshold or cluster utilization is not greater than the predetermined threshold, then in step 206, resource manager 162 releases the timer if a timer is active (i.e., if a timer exists). It should be appreciated that if only one threshold is not met, resource manager 162 will release the timer if a timer is active. A cluster, or computer cluster, consists of a set of loosely or tightly connected computers that work together so that, in many respects, they can be viewed as a single system. In this exemplary embodiment, resource manager 162 determines if the cluster is busy, because resource utilization is very high in a cluster. A timer is an input setting that is set to check VM resource utilization and cluster utilization every unit of time (e.g., 1 minute, 10 minutes, etc.). In this exemplary embodiment, if a timer is active, the timer is removed or deleted. The process then begins again from step 202. If a timer is not active (i.e., does not exist), the process simply begins again from step 202.

If, in step 204, resource manager 162 determines that both VM resource utilization is below the predetermined threshold and cluster utilization is above the predetermined threshold, then in step 208, resource manager 162 determines whether a timer is active.

If, in step 208, resource manager 162 determines that a timer is not active, then in step 210, resource manager 162 triggers a timer. In this exemplary embodiment, resource manager 162 creates a timer and sets it to the preferred unit of time (e.g., 1 minute, 10 minutes, etc.). After the timer is triggered, the process begins again from step 202.

If, in step 208, resource manager 162 determines that a timer is not active, then in step 212, resource manager 162 determines whether the timer has expired. In this exemplary embodiment, resource manager 162 determines whether the preset unit of time (e.g., 1 minute, 10 minutes, etc.) has expired.

If, in step 212, resource manager 162 determines that the timer has not expired, then the process begins again from step 202.

If, in step 212, resource manager 162 determines that the timer has expired, then in step 214, resource manager 162 triggers dynamic decommission of the VM. In this exemplary embodiment, the VM is decommissioned dynamically by the process depicted in flowchart 200. During the decommission stage, system resource monitor 130 detects the resource usage of the VM and submits this information to resource manager 162 in master node 160 (which is normally the VM management node). Master node 160 will decide how many resources can be released periodically, based on the VM resource utilization information. When resource manager 162 determines that is a resource that can be released, it notifies virtualization management interface 164 to release the resource for VM. Resource manager 162 determines how many resources should be released based on: (i) resource utilization and the maximum resources the VM holds, which is reported by the VM during the decommission stage; and (ii) resource utilization of the entire cluster, which can be retrieved from virtualization management interface 164. There are two triggers for resource manager 162 to notify system administrator 126 to release the VM: (i) receiving the decommission stop from app administrator 122; or (ii) determining that the VM has become a zombie. After resource manager 162 triggers the dynamic decommission of the VM the process begins again from step 202. It should be appreciated that the decision to trigger dynamic decommission of the VM is determined, in part, by app administrator 122 (FIG. 3A) and system administrator 126 (FIG. 3B). Resource manager 162 will also call the corresponding API to terminate VMs when it receives the terminal signal from system resource monitor 130. Once the decommission phase is completed by decommission arbitrator 128, resource manager 162 will call API adapter to destroy the current VM.

Accordingly, by performing the operational steps of FIG. 2, the system reclaims resources by releasing unneeded resources during VM decommission.

Figure 3A:
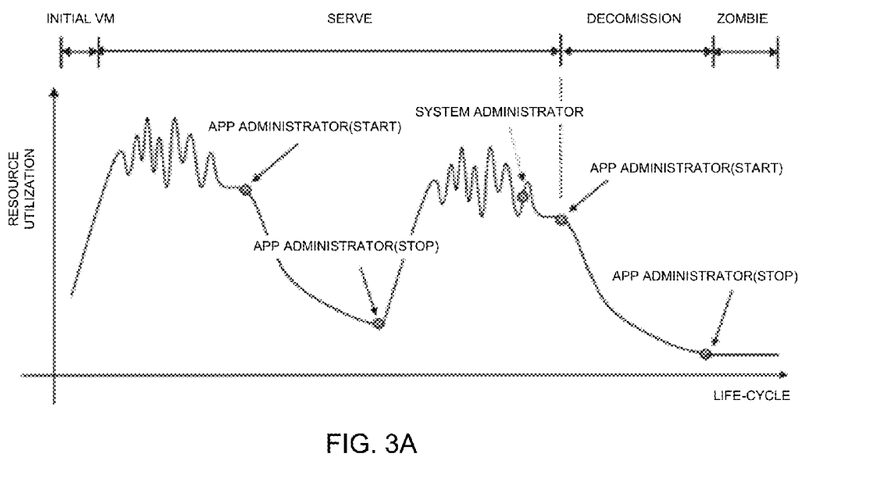
FIGS. 3A and 3B are diagrams depicting the life cycle of a virtual machine, in accordance with an embodiment of the present invention.
Figure 3B:
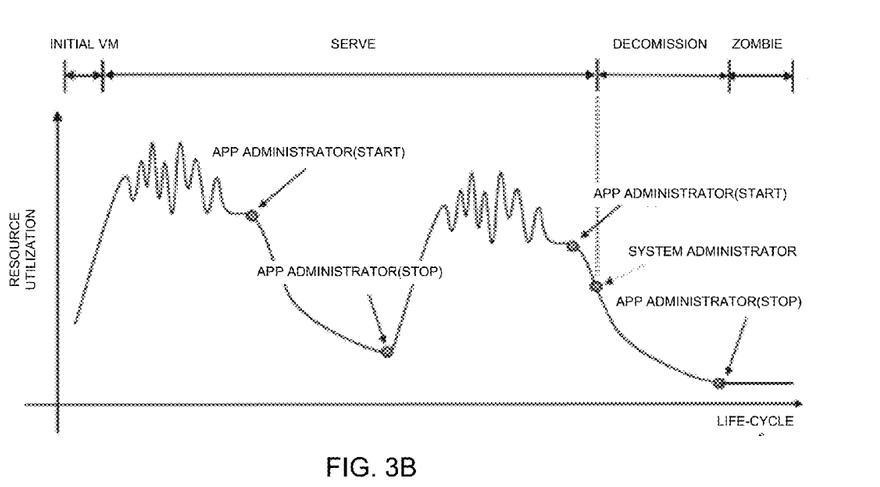

FIGS. 3A and 3B are diagrams depicting the life cycle of a virtual machine, in accordance with an embodiment of the present invention. In FIG. 3A, the decommission stage is entered based on input from app administrator 122. In FIG. 3B, the decommission stage is entered based on input from system administrator 126. System administrator 126 determines when no more apps will be distributed to the VM. App administrator 122 determines when the last app has finished. Decommission will begin at the later moment of these two determinations. As depicted in FIG. 3A, decommission begins when input from app administrator 122 is received, as this occurs later in time than receiving input from system administrator 126. In FIG. 3B, decommission begins when input from system administrator 126 is received, as this occurs later in time than receiving input from app administrator 122.

Figure 4:
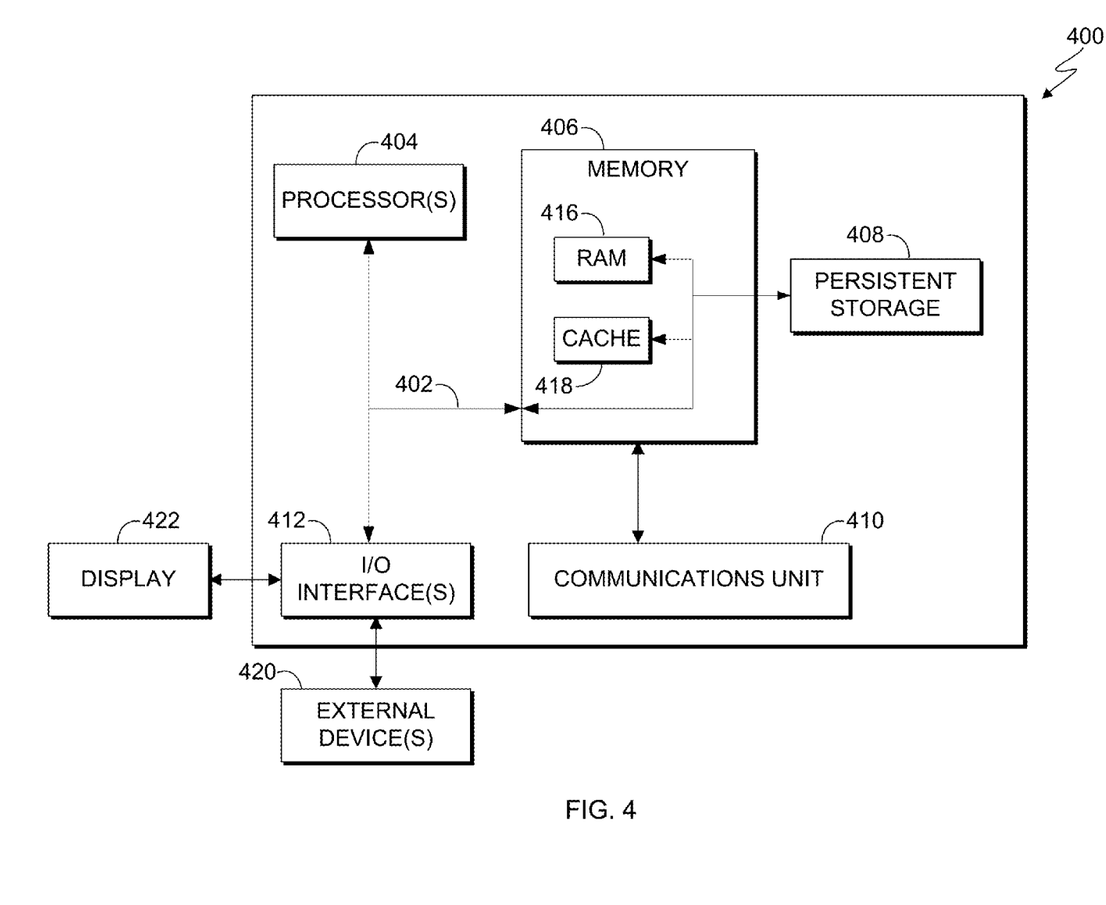
FIG. 4 is a block diagram of internal and external components of a computer system, in accordance with an embodiment of the present invention.

FIG. 4 is a block diagram of internal and external components of computing device 400, which is representative of computing environment 100 of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computerreadable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computerreadable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computerreadable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for reclaiming resources during virtual machine decommission, the method comprising:
   receiving, by one or more computer processors, information regarding resource utilization of a virtual machine (VM);
   determining, by one or more computer processors, whether the resource utilization of the VM is less than a first predetermined threshold;

determining, by one or more computer processors, whether a cluster utilization of the VM is greater than a second predetermined threshold;

determining, by one or more computer processors, whether a timer is active;

in response to determining that the timer is active, determining, by one or more computer processors, whether the timer has expired;

in response to determining that the timer has expired, determining, by one or more computer processors, at what time a dynamic decommission of the VM may occur, based, at least in part, on a VM resource utilization information finding; and in response to the determined time the dynamic decommission of the VM can occur, triggering, by one or more computer processors, a dynamic decommission of the VM.

2. The method of claim 1, further comprising:

determining, by one or more computer processors, that the resource utilization of the VM is not less than the first predetermined threshold; and in response to determining that the timer is active, removing, by one or more computer processors, the timer.

3. The method of claim 1, further comprising:

determining, by one or more computer processors, that the cluster utilization of the VM is not greater than the second predetermined threshold; and in response to determining that the timer is active, removing, by one or more computer processors, the timer.

4. The method of claim 1, further comprising:

in response to determining that the timer is not active, creating, by one or more computer processors, a new timer.

5. The method of claim 1, wherein receiving information regarding resource utilization of a virtual machine (VM) comprises:

detecting, by one or more system resource monitors, a level of resource utilization of the VM; and reporting, by one or more computer processors, the level of resource utilization of the VM to a resource manager.

6. The method of claim 5, wherein the resource manager is configured to: release resources and determine whether the VM is a zombie.

7. The method of claim 1, wherein triggering the dynamic decommission of the VM is initiated, in part, by the later in time of:

a system administrator, wherein the system administrator determines that no more applications (apps) will be distributed to the VM; and an application (app) administrator, wherein the app administrator determines that a last app has finished running on the VM.

8. A computer program product comprising:

a computer readable storage medium and program instructions stored on the computer readable storage medium, the program instructions comprising:

program instructions to receive information regarding resource utilization of a virtual machine (VM);

program instructions to determine whether the resource utilization of the VM is less than a first predetermined threshold;

program instructions to determine whether a cluster utilization of the VM is greater than a second predetermined threshold;

program instructions to determine whether a timer is active;

program instructions to, in response to determining that the timer is active, determine whether the timer has expired;

in response to determining that the timer has expired, program instructions to determine at what time a dynamic decommission of the VM may occur, based, at least in part, on a VM resource utilization information finding; and in response to the determined time the dynamic decommission of the VM can occur, program instructions to, in response to determining that the timer has expired, trigger a dynamic decommission of the VM.

9. The computer program product of claim 8, further comprising:

program instructions to determine that the resource utilization of the VM is not less than the first predetermined threshold; and program instructions to, in response to determining that the timer is active, remove the timer.

10. The computer program product of claim 8, further comprising:

program instructions to determine that the cluster utilization of the VM is not greater than the second predetermined threshold; and program instructions to, in response to determining that the timer is active, remove the timer.

11. The computer program product of claim 8, further comprising:

program instructions to, in response to determining that the timer is not active, create a new timer.

12. The computer program product of claim 8, wherein the program instructions to receive information regarding resource utilization of a virtual machine (VM) comprise:

program instructions to detect a level of resource utilization of the VM; and program instructions to report the level of resource utilization of the VM to a resource manager.

13. The computer program product of claim 12, wherein the resource manager is configured to: release resources and determine whether the VM is a zombie.

14. The computer program product of claim 8, wherein the program instructions to trigger the dynamic decommission of the VM is initiated, in part, by the later in time of:

a system administrator, wherein the system administrator determines that no more applications (apps) will be distributed to the VM; and an application (app) administrator, wherein the app administrator determines that a last app has finished running on the VM.

15. A computer system comprising:

one or more computer processors;

one or more computer readable storage media;

program instructions stored on the computer readable storage media for execution by at least one of the one or more computer processors, the program instructions comprising:

program instructions to receive information regarding resource utilization of a virtual machine (VM);

program instructions to determine whether the resource utilization of the VM is less than a first predetermined threshold;

program instructions to determine whether a cluster utilization of the VM is greater than a second predetermined threshold;

program instructions to determine whether a timer is active;

program instructions to, in response to determining that the timer is active, determine whether the timer has expired;

in response to determining that the timer has expired, program instructions to determine at what time a dynamic decommission of the VM may occur, based, at least in part, on a VM resource utilization information finding; and in response to the determined time the dynamic decommission of the VM can occur, program instructions to, in response to determining that the timer has expired, trigger a dynamic decommission of the VM.

16. The computer system of claim 15, further comprising:
program instructions to determine that the resource utilization of the VM is not less than the first predetermined threshold; and
program instructions to, in response to determining that the timer is active, remove the timer.

17. The computer system of claim 15, further comprising:
program instructions to determine that the cluster utilization of the VM is not greater than the second predetermined threshold; and program instructions to, in response to determining that the timer is active, remove the timer.

18. The computer system of claim 15, further comprising:
program instructions to, in response to determining that the timer is not active, create a new timer.

19. The computer system of claim 15, wherein the program instructions to receive information regarding resource utilization of a virtual machine (VM) comprise:
program instructions to detect a level of resource utilization of the VM; and
program instructions to report the level of resource utilization of the VM to a resource manager.

20. The computer system of claim 15, wherein the program instructions to trigger the dynamic decommission of the VM is initiated, in part, by the later in time of:
a system administrator, wherein the system administrator determines that no more applications (apps) will be distributed to the VM; and
an application (app) administrator, wherein the app administrator determines that a last app has finished running on the VM.

* * * * *